(12) United States Patent
Sonobe et al.

(10) Patent No.: US 7,989,066 B2
(45) Date of Patent: Aug. 2, 2011

(54) SUPPORT MEMBER FOR HIGH-TEMPERATURE HEAT-TREATED METAL MOLDING OBJECT AND PROCESS FOR PRODUCTION THEREOF

(75) Inventors: Naohiro Sonobe, Fukushima-Ken (JP); Hiroshi Ohta, Fukushima-Ken (JP); Hideaki Sato, Fukushima-Ken (JP); Yo Otani, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 1033 days.

(21) Appl. No.: 10/869,832

(22) Filed: Jun. 18, 2004

(65) Prior Publication Data

US 2004/0258950 A1 Dec. 23, 2004

(30) Foreign Application Priority Data

Jun. 18, 2003 (JP) ................. 2003-173910

(51) Int. Cl.
*B32B 9/00* (2006.01)
(52) U.S. Cl. ...................................... 428/408
(58) Field of Classification Search ........... 428/698, 428/701, 408
See application file for complete search history.

(56) References Cited

U.S. PATENT DOCUMENTS

| | | | | |
|---|---|---|---|---|
| 5,531,943 A | * | 7/1996 | Sudani et al. | 264/29.1 |
| 6,629,884 B1 | * | 10/2003 | Goers | 451/540 |
| 2003/0178357 A1 | * | 9/2003 | Wolff et al. | 210/263 |

FOREIGN PATENT DOCUMENTS

| | | |
|---|---|---|
| JP | 56-17985 | 2/1981 |
| JP | 7-89769 | 4/1995 |
| JP | 7-216406 | 8/1995 |
| JP | 8-198685 | 8/1996 |
| JP | 2002-154875 | 5/2002 |

* cited by examiner

*Primary Examiner* — David R Sample
*Assistant Examiner* — Daniel Miller
(74) *Attorney, Agent, or Firm* — Wenderoth, Lind & Ponack, L.L.P.

(57) ABSTRACT

A carbonaceous support member for a high-temperature heat-treated metal molding object, particularly a setter for heat-treatment in powder metallurgy, is formed as a carbon-ceramic composite shaped product having a bulk density of 1.2-1.6 g/ml and including a carbonaceous matrix and 3-20 wt. % of ceramic particles which are uniformly dispersed in the carbonaceous matrix and partly exposed to the surface of the composite. The support member can effectively prevent carburization of a metal molding object supported thereby during the heat-treatment without causing a problem of peeling of coating layer as encountered in a ceramic-coated support member. The support member may be prepared by compression molding of a powdery mixture of a fine carbon precursor and ceramic particles, followed by heating at 1000-2000° C. to carbonize the fine carbon precursor.

4 Claims, No Drawings

SUPPORT MEMBER FOR HIGH-TEMPERATURE HEAT-TREATED METAL MOLDING OBJECT AND PROCESS FOR PRODUCTION THEREOF

FIELD OF THE INVENTION AND RELATED ART

The present invention relates to a carbonaceous support member used for supporting a metal molding object heat-treated at high temperatures, and a process for producing the support member.

Powder metallurgy is a process of compressing metal powder to form a shaped powder compact and heat-treating the shaped compact at high temperatures to provide a sintered and shaped metal object. Accordingly, the powder metallurgy is better in mass-productivity and much more excellent in product yield than other production processes and is therefore widely used as a process for providing, e.g., steel-made mechanical parts, such as cams and shafts for automobiles.

A carbonaceous support member, which is light and has an excellent thermal conductivity, is used as a support plate (setter) for supporting such a shaped metal powder compact to be sintered in a reducing or non-oxidizing atmosphere in the powder metallurgy (as disclosed in, e.g., Japanese Laid-Open Patent Application (JP-A) 8-198685), or a holding member for a metal shell ring used in sealing of electronic parts with fused glass (as disclosed in, e.g., JP-A 5-319929). Such a carbonaceous support member for heat-treating high-temperature heated metal object is required of freeness from carburization (a phenomenon of transfer of carbon as by diffusive penetration into solid metal) into a high-temperature heat-treated metal object, as an important property, in addition to thermal impact resistance for enduring a repetition of heating to 800° C. or higher and cooling. These requirements are particularly intense in the case of treating metal objects of iron (Fe)-based metals, inclusive of: Fe alone, and Fe alloys comprising principally Fe together with graphitization-promoting elements, such as nickel (Ni), cobalt (Co), aluminum (Al) and silicon (Si), or other alloying elements.

For example, the carburization occurring in the heat treatment of a metal powder compact is assumed to proceed as follows. As is well known, carbon (C) forms a solid solution with iron to provide an iron alloy having a remarkably reduced melting temperature. Accordingly, if carbon of a setter for sintering a metal powder compact diffuses into the powdery metal to form a solid solution, the melting point of the metal is lowered to cause the melt-sticking of the metal object to the setter. If the metal object once melt-sticks to the carbonaceous setter, the contact area between the metal and the carbon is increased to promote the carburization, thereby further lowering the melting point of the metal, until the metal object completely melts down in extreme cases.

Some proposals have been made for preventing the above-mentioned carburization phenomenon.

For example, by noting that non-graphitizable carbon is effective for suppressing the carburization, there have been proposed a shaped plate of glass-like carbon (amorphous carbon) that is a carbonized product of a thermosetting resin as the starting material (JP-A 10-67559), and a press-molded and calcined product of particulate non-graphitizable carbon after coating with a thermosetting resin (JP-A 2002-154875). Until now, however, the use of such a carbon structure different from graphite has not succeeded in providing a sufficient effect of suppressing the carburization.

Ti, Nb, V, Ta, W, Mo, Cr, Mn, etc., are known as metal elements having a stronger affinity with carbon than Fe, and it is possible to prevent the carburization if the carbonaceous setter is coated with a film of carbide of these metal elements, e.g., by plasma flame spraying. However, such a coated setter is liable to cause peeling of the coating film from the setter because of a difference in thermal expansion coefficient between the film and the carbonaceous setter substrate when subjected to a repetition of heating-cooling cycle. The peeling of the coating film can be alleviated if the film is made thinner but, in this case, the coating is liable to be lost by wearing during the use.

Several proposals have been made to prevent the carburization by surface-coating a carbonaceous setter with a ceramic layer. For example, these proposals include: a method of coating with chromic acid, followed by calcination to form a chromium oxide film (JP-A 2-212385), a method of press-bonding a paper-like sheet principally comprising ceramic powder under heating (JP-A 8-198685), and a method of plasma-spraying yttrium oxide ($Y_2O_3$) (JP-A 2000-509102, JP-A 2002-179485). However, any of such ceramic coating films as proposed above cannot endure a repetition of a cycle of heating to a high temperature and cooling due to a difference in thermal expansion coefficient with the substrate carbonaceous plate, thus exhibiting only a limited life.

SUMMARY OF THE INVENTION

In view of the above-mentioned problems of known materials, an object of the present invention is to provide a support member for a metal object free from the peeling of film or coating under a repetition of heat-treatment of metal molding object in powder metallurgy and other processes and yet capable of effectively preventing the carburization even at a temperature of 1000° C. or higher, particularly a setter for heat treatment in the powder metallurgy.

Another object of the present invention is to provide an effective process for production of such a carbonaceous support member.

As a result of our study for achieving the above-mentioned objects, we have discovered that a carbon-ceramic composite product obtained by appropriate compression-molding and heat-treatment of a carbon precursor and a certain ceramic material (used herein as excluding a carbon material though a carbon material is classified under ceramics in some cases), provides a support member for metal object exhibiting an excellent carburization suppression effect, thus arriving at the present invention.

According to the present invention, there is provided a support member for a high-temperature heat-treated metal molding object, comprising: a carbon-ceramic composite shaped product comprising a carbonaceous matrix and 3-20 wt % of ceramic particles uniformly dispersed in the carbonaceous matrix and partly exposed to a surface of the carbon-ceramic composite shaped product, said carbon-ceramic composite shaped product having a bulk density of 1.2-1.6 g/ml.

Such a support member for metal molding object of the present invention can be produced through a process including: molding a dispersive mixture of a fine carbon precursor and ceramic particles to form a compact under pressure, and heat-treating the compact to carbonize the carbon precursor at 1000-2000° C.

DETAILED DESCRIPTION OF THE INVENTION

Hereinbelow, the function of the support member for high-temperature heat-treated metal molding object is described more specifically principally with reference to a setter for heat treatment in powder metallurgy, as a representative embodiment thereof.

The setter for heat treatment in powder metallurgy according to the present invention is free from the problem of peeling of a ceramic layer as encountered in a conventional setter formed by coating a carbon plate with a ceramic layer. Peeling between two different materials is caused in proportion to a slip distance determined as a product of (a boundary length)×(a difference in thermal expansion coefficient) or caused by a magnitude of slipping (or shearing) stress between the two materials proportional to the slip distance. Accordingly, a shearing stress as large as causing peeling does not occur between a matrix carbonaceous material and a ceramic particle which has an extremely small adhesion boundary length with the carbonaceous matrix compared with a coating ceramic layer.

The setter for heat treatment in powder metallurgy according to the present invention exhibits a better carburization prevention effect than a setter comprising a carbon plate alone, presumably because the ceramic particles obstruct the contact between the carbon and a metal molding object causing the carburization. Further, the ceramic particles are dispersively present in the entire body (carbonaceous matrix) of the setter. Accordingly, even if a superficial layer of the setter is worn out, the ceramic particles are successively exposed to the surface of the setter to reduce the lowering in carburization prevention effect.

The setter for heat treatment in powder metallurgy of the present invention contains only a small amount of 3-20 wt. % (which corresponds a half or below in member of percentage by volume if a difference in specific gravity between carbon and ceramic is taken into account). Accordingly, the surface exposure rate of the ceramic particles is very low, whereas the ceramic particles exhibit a good carburization prevention effect. We assume the reason as follows.

In the setter of the present invention which is a carbonized product of a compression-molded compact of a dispersive mixture of a fine carbon precursor and ceramic particles, a portion of the carbon precursor is lost by evaporation during the carbonization to cause a shrinkage of the carbonaceous matrix, thus leaving projections of ceramic particles at the surface of the resultant setter, whereby even a relatively small amount of ceramic particles can effectively suppress the contact between carbon and metal object which is a cause of the carburization. For this purpose, ceramic particles having an appropriately large primary particle size of 50-500 μm are preferred so as to provide projections exhibiting a strength capable of supporting the weight of the metal molding object. Further, the surface ceramic particles may be lost accompanying the wearing and surface burning of the setter, whereas the ceramic particles are allowed to remain as projections since the burning loss is preferentially caused with respect to the carbonaceous matrix than the ceramic particles.

Another assumption as follows is possible in view of the mechanism of carburization. Carburization is a phenomenon of carbon dissolving into a metal, such as iron. For example, in the case where an iron-based metal powder compact is placed on a setter of carbonaceous material and heat-treated, the heat treatment is performed at 1100-1200° C. In this case, carburization proceeds as follows. Pure iron has a melting point above 1150° C. but the melting point is lowered down to ca. 1150° C. as carbon diffuses into the iron by carburization. As carburization occurs at a contact point between the carbon plate and the metal molding object, the portion of the metal contacting the carbon plate is caused to have a lower melting point, and if the heat treatment temperature exceeds 1150° C., the metal portion melts and sticks to the carbon plate. As the lowest portion of the metal object melts, the metal object sinks by its own gravity to increase the contact portion with the carbon plate and promote the carburization until the metal object melts down. As is understood from the above explanation, the carburization is promoted by a cycle of phenomena including a lowering in melting point due to carburization, an increase of contact portion between metal and carbon due to the lowering in melting point and an increase in carburization reaction area due to the increase in contact portion. Accordingly, it is assumed that if carburization once occurs at a contact point between carbon and metal, the carburization proceeds progressively due to successive occurrence of phenomena in the above-mentioned cycle.

It is assumed most effective to cut off the above-mentioned cycle in order to suppress the carburization at a contact point between a carbon plate and a metal object. In the setter of the present invention wherein ceramic particles hardly reacting with a metal are disposed at an appropriate proportion in the setter, even if carbon and metal react with each other locally, the sinking of the metal object due to melting of the lower portion of the metal object is suppressed owing to the contact with ceramic which is free from carburization, so that the carbon supply rate to the metal object is remarkably lowered to remarkably suppress the carburization. This is another assumption for explaining the effective function of the support member of the present invention.

DESCRIPTION OF PREFERRED EMBODIMENTS

The support member for metal object, particularly the setter for heat treatment in powder metallurgy, of the present invention can be prepared by mixing a fine carbon precursor with ceramic particles, molding the resultant mixture under pressure to form a compact, and heat-treating the compact at 1000-2000° C. The following description will be made principally with reference to the setter for heat-treatment in powder metallurgy as a principal embodiment of the support member for high-temperature heat-treated metal object.

The fine carbon precursor may be prepared by appropriately heat-treating pitches of coal or petroleum origin, various thermosetting resins, etc., followed by conversion into a fine form as desired. The fine carbon precursor may have a shape of fiber or particles (inclusive of spheres). Fibrous carbon precursor may be added in order to strengthen the setter. If the fiber length is too short, a sufficient strength cannot be attained, and if too long, the molding of the setter becomes difficult. The fibrous carbon precursor may preferably have a number-average fiber diameter of 7-30 μm and a number average fiber length of 0.05-7 mm, more preferably 0.09-0.5 mm. Further, the particulate (inclusive of spherical) ceramic particle may preferably have an average particle size (a diameter giving cumulatively 50% by volume) of 150 μm-2 mm, particularly 0.3-1 mm.

The carbon precursor is converted into a carbonaceous material (matrix) by heat treatment. The texture of the carbonaceous matrix as a major component of the setter largely depends on the texture of the carbon precursor. In the present invention, the texture of the carbonaceous matrix formed by the heat treatment of the carbon precursor is not particularly restricted, but may preferably comprise non-graphitizable carbon which causes isotropic thermal expansion and shrinkage on heating and cooling, respectively.

An example of carbon precursor for providing a non-graphitizable carbonaceous matrix particularly preferably used in the present invention may be prepared as follows.

That is, a pitch, such as petroleum pitch or coal pitch, is mixed under heating with an additive comprising an aromatic compound of two or three aromatic rings having a boiling point of at least 200° C. or a mixture of such aromatic compounds, and the mixture is then shaped to provide a shaped pitch product. Then, the additive is removed from the shaped pitch product by extraction with a solvent having a low dissolving power to the pitch and a higher dissolving power to the additive, to leave a porous pitch product, which is then oxidized to provide an infusibilized product. After the infusibilization or at any stage proceeding thereto, the product is rendered fine to provide a fine non-graphitizable carbon precursor. The above-mentioned aromatic additive may for example comprise one or a mixture of two or more species selected from naphthalene, methylnaphthalene, phenylnaphthalene, benzylnaphthalene, methylanthracene, phenanthrene and biphenyl. The addition amount thereof may preferably be in the range of 30-70 wt. parts per 100 wt. parts of the pitch.

The mixing of the pitch and the additive may be performed in a molten state under heating in order to accomplish uniform mixing. The mixture of the pitch and the additive may preferably be shaped into particles having a size of 1 mm or smaller. The shaping may be performed in a molten state or, e.g., by pulverization, after cooling.

Suitable examples of the solvent for removing the additive from the mixture of the pitch and the additive may include: aliphatic hydrocarbons, such as butane, pentane, hexane and heptane; mixtures comprising principally aliphatic hydrocarbons, such as naphtha and kerosene; and aliphatic alcohols, such as methanol, ethanol, propanol and butanol.

By extracting the additive from the shaped mixture product with such a solvent, it is possible to remove the additive from the shaped product while retaining the shape of the product. At this time pores are formed at sites from which the additive is removed, thereby providing a uniformly porous pitch product.

The thus-obtained porous pitch product is then subjected to oxidation (infusibilization) with an oxidizing agent to develop a crosslinking texture, thereby providing a non-graphitizable carbon precursor. The oxidation treatment may be performed at a temperature of preferably 100-400° C. Examples of the oxidizing agent may include: oxidizing gases, such as $O_2$, $O_3$, $SO_3$, $NO_2$, mixture gases formed by diluting these gases with, e.g., air or nitrogen, and air; and oxidizing liquids, such as sulfuric acid, nitric acid, and hydrogen peroxide aqueous solution.

In the present invention, a non-graphitizable carbon precursor as produced in the above-described manner and ceramic particles may be mixed and compressed into a precursor compact, which may be heat-treated at a temperature of at least 1000° C. and at most 2000° C. in a non-oxidizing atmosphere. It is however necessary to optimize the precursor compact in order to provide a setter of a good quality for heat treatment in powder metallurgy. If the precursor compact or shaped body contains too much volatile matter, gas evolution during the heat treatment becomes excessive so that discharge of the evolved gas inside the compact becomes difficult to cause a rupture of the setter. On the other hand, if the volatile matter is too small in amount, this means a shortage of binder component, and the adhesion between the particles during the heat treatment is insufficient, thus failing to provide a sufficiently strong setter for heat treatment in powder metallurgy. The precursor compact may preferably have a volatile matter content of 5-30 wt. %, more preferably 10-25 wt. %.

In order to control the volatile matter and binder component in the carbon precursor, it is preferred to mix an additional carbon precursor, such as a pitch or a thermosetting resin. It is particularly preferred to coat the above-mentioned non-graphitizable carbon precursor with a thermosetting resin. In order to uniformly attach the ceramic particles to the surface of the non-graphitizable carbon precursor, it is particularly preferred to simultaneously effect the surface-coating of the non-graphitizable carbon precursor with a thermosetting resin and the attachment of ceramic particles onto the non-graphitizable carbon precursor. The coating with a thermosetting resin imparts a room temperature adhesiveness not possessed by the fine carbon precursor and a compression-moldability to the fine carbon precursor, and at the time of calcination, the thermosetting resin per se is carbonized so as to fill the gap or void in the fine carbon precursor, thereby providing a non-graphitic carbon product integral with the carbonized product of the non-graphitizable fine carbon precursor. In this instance, it is preferred to coat 95-60 wt. parts of the fine carbon precursor with 5-40 wt. parts of thermosetting resin (giving a total of 100 wt. parts with the carbon precursor). If the thermosetting resin is below 5 wt. parts, it is difficult to sufficiently attain an intended addition effect of the thermosetting resin, and in excess of 40 wt. parts, too much volatile matter is evolved during the calcination to cause a foaming of the compact (or molded product), thus being liable to fail in providing a prescribed shape of non-graphitic carbon-ceramic composite product. At the time of calcination, a thermosetting resin exhibits a high percentage of carbonization into non-graphitic carbon and can easily form a good carbon/carbon composite with the carbonized product of the fine carbon precursor, so that it is preferred than a thermo-plastic resin. The fine carbon precursor and the thermosetting resin both provide carbonized products of similar non-graphitic textures, thus providing a non-graphitic carbon material which is entirely uniform inclusive of uniformity of thermal expansion coefficient and excellent in thermal impact resistance, after the calcination. The thermosetting resin may preferably be liquid at least partially, and examples thereof may include: phenolic resin, furan resin, unsaturated polyester resin, and polyimide resin (precursor). Among these, phenolic resin is preferred. In a particularly preferred embodiment, the fine carbon precursor is first surface-coated with resole-type liquid phenolic resin, and the novolak-type solid phenolic resin is attached thereto.

The ceramic particles are incorporated in the product setter of carbon-ceramic composite material for the purpose of obstructing a contact between carbon in the setter and a metal powder compact during heat treatment for sintering the compact. Accordingly, if the content of the ceramic particles in the setter for heat treatment in powder metallurgy is too small, the effect of obstructing the contact between the metal compact and the carbon is liable to be scarce, and if the content is excessively large, the product setter for heat treatment in powder metallurgy is liable to cause a lowering in strength either being undesirable. Accordingly, the setter for heat treatment in powder metallurgy may preferably have a content of ceramic particle of at least 3 wt. % and at most 20 wt. %. From the viewpoint of suppressing a breakage due to thermal expansion and shrinkage of the setter during the repetition of heat treatment, the ceramic particles may preferably be uniformly dispersed in the carbonaceous matrix while exposing a portion thereof to the surface of the setter.

The ceramic particles to be added may comprise any kind of ceramics inclusive of, for example, oxide-form ceramics and nitride-form ceramics, as far as they hardly react with metals comprising iron or oxides thereof in the temperature region for sintering in powder metallurgy. As for the particle size of the ceramic particles, too small a particle size exhibits only a scarce effect of suppressing the contact between the metal object and the carbon of the support member. Too large a particle size results in a decrease in number of contact between the carbon and the carbonaceous matrix leading to a reduction in strength and a breakage of the setter due to a difference in thermal expansion and shrinkage between the carbonaceous matrix and the ceramic particles. Accordingly, the ceramic particles may preferably have an average particle size (a particle size giving cumulatively 50% by volume) of 50-500 μm, more preferably 80-300 μm. It is further preferred that at least 20 wt. % of the ceramic particles have particle sizes in the above-mentioned range for the average particle size. Some types of ceramic particles, e.g., a certain form of alumina, can form secondary particles by agglomeration or melt-sticking of primary particles. In such a case, the above-mentioned particle size refers to a primary particle size in the present invention. For a similar reason, the ceramic particles used in the present invention may preferably comprise primary particles free from secondary agglomeration. Even if the ceramic particles have a secondary particle size of 50 μm or larger, they can be reduced into primary particles due to a stress exerted during the dispersive mixing with the fine carbon precursor and compression molding, or a load exerted from the metal object during the heat treatment, thus being liable to fail in exhibiting the intended particle size effect. It is necessary for the ceramic particles have a melting point higher than the temperature for sintering the metal powder compact, preferably a melting point of at least 1300° C., more preferably at least 1500° C. As an example of ceramic material complying with such requirements, it is preferred to use particles of alumina or fused alumina formed by melt-fusion of alumina-based starting material, followed by pulverization. As for the purity, the alumina particles may preferably have a high alumina purity, also from the viewpoint of obviating the commingling of impurities to the metal powder compact, preferably at least 90 wt. %, further preferably at least 95 wt. %.

The fine carbon precursor and the ceramic particles are mixed and compression-molded to form a compact (i.e., a precursor of support member). The compression molding may preferably be performed at room temperature or at an elevated temperature of up to 250° C. under a pressure of 0.5-30 MPa. The compact or precursor is then heat-treated (calcined) to provide a support member, such as a setter. If the calcination temperature is below 1000° C., the carbonization of the carbon precursor as a principal component of the compact is liable to be insufficient, and a temperature in excess of 2000° C. is liable to promote a reaction between the added ceramic particles and the fine carbon precursor or can possibly exceed the melting point of the ceramic particles. The calcination temperature may preferably be 1000-1800° C., further preferably 1200-1600° C.

An average layer-plane spacing according to X-ray diffractometry is a good measure of texture of carbonaceous material constituting the thus-produced support member. More specifically, the carbonaceous material constituting the setter of the present invention may preferably have a 002-plane layer spacing ($d_{002}$) of at least 0.34 nm. The handling of a support member, particularly a setter for heat-treatment in powder metallurgy, becomes easier, if it is lighter in weight, but if it is too light, voids in the setter are liable to be larger, thus resulting in a weaker strength. Accordingly, the support member containing ceramic particles of the present invention may preferably have a bulk density of 1.2-1.6 g/ml. If the bulk density is below 1.2 g/ml, it becomes difficult to attain a sufficient strength. Above 1.6 g/ml, the setter is liable to have an increased number of contacts with the metal molding object thereon. It is also a preferred that the support member, particularly the setter, has a bending strength of at least 15 MPa.

EXAMPLES

Hereinbelow, the present invention will be described more specifically with reference to Examples and Comparative Examples. Physical properties described herein including the following Examples are based on values measured according to the following methods.

(1) Average Layer-Plane Spacing ($d_{002}$) of Carbonaceous Material

A powdery sample of a carbonaceous material is packed in an aluminum-made sample cell and irradiated with monochromatic CuKα rays (wavelength λ=0.15418 nm) through a graphite monochromator to obtain an X-ray diffraction pattern. The peak position of the diffraction pattern is determined by the center of gravity method (i.e., a method wherein the position of a gravity center of diffraction lines is obtained to determine a peak position as a 2 θ value corresponding to the gravity center) and calibrated by the diffraction peak of (111) plane of high-purity silicon powder as the standard substance. The $d_{002}$ value is calculated from the Bragg's formula shown below.

$$d_{002}=\lambda/(2 \cdot \sin \theta) \quad \text{(Bragg's formula)}$$

(2) Volatile Matter Content

According to a fixed carbon content measurement method described in JIS K2425 (Testing method for creosote oil, processed tar, and tar pitch), a fixed carbon content at 800° C. of a sample is measured, and a volatile matter content is calculated by subtracting the fixed carbon content from the initial weight of the sample.

(3) Average (Primary) Particle Size

Three drops of a dispersant (a cationic surfactant; "SN DISPERSANT 7347C", made by Sun Nopco Co.) are added to ca. 0.1 g of a sample to wet the sample with the dispersant. Then, 30 ml of pure water is added to the sample, and the mixture is dispersed for ca. 2 min. by an ultrasonic washer to form a primary particle dispersion liquid, which is then subjected to a measurement of particle size distribution in a particle size range of 0.1-1000 μm by means of a particle size measurement apparatus ("MICROTRACK FRA-9220", made by Nikkiso K. K.), thereby obtain a 50%-cumulative volume-average particle size.

(4) Ceramic Content in a Setter

A sample setter is burnt at 1000° C. in air to leave a residue, and the weight of the residue regarded as the ceramic weight is divided by the weight of the sample to provide a ceramic content.

(5) Evaluation of Carburization

A powdery alloy of iron 59 wt. %, graphite 1 wt. %, nickel 20 wt. %, and cobalt 20 wt. %, is compression-molded under a pressure of 100 MPa into a disk-shaped metal powder compact of 20 mm in diameter and 5 mm in thickness. The thus-prepared metal powder compact is placed on a sample of carbonaceous setter for heat-treatment in powder metallurgy and held at 1150° C. or 1200° C. for 1 hour in a nitrogen atmosphere to sinter the metal powder compact. Then, the surfaces of the sintered product and the setter were observed to evaluate the presence or absence of carburization (i.e., surface roughening or color change). The results were evaluated according to the following standard.

A: No carburization is observed.
B: Carburization is observed on at least one of the sintered product and the carbonaceous setter.

C: The sintered metal product is melted to leave a trace of distortion on the setter sample in a shape corresponding to the sintered product.

Example 1

83 wt parts of a spherical infusibilized pitch of petroleum origin having an average particle size of 0.62 mm ("KH-1B, made by Kureha Chemical Industry Co., Ltd.; oxygen content=7.1%, fixed carbon content=72.1%, specific volume of open pores=ca. 0.05 g/ml) as a non-graphitizable carbon precursor, was surface-coated with 6 wt. parts of resole-type liquid phenolic resin ("RESITOP PL-4804", made by Gun Ei Chemical Industry Co., Ltd.). Then, 8 wt.parts of novolak-type solid phenolic resin ("PG-2411", made by Gun Ei Chemical Industry Co., Ltd.; average particle size=20-80 μm) and 3 wt. parts of alumina powder ("ALUNDUM PARTICLES #80", made by K. K. Nikkato; $Al_2O_3$ content=at least 99%, average particle size=200 μm), were attached to the resole-coated carbon precursor particles to provide a molding material. The molding material was charged in a flat mold and molded at a pressure of 5 Mpa and at 170° C. or above for 15 min. to form a ca. 7 mm-thick plate-shaped compact. The plate-shaped compact was further heat-treated at 150° C. for 24 hours to cure the phenolic resin. The thus-treated plate compact was laid flat in a graphite crucible and was placed together with the crucible in a kiln, and after vacuum evacuation, heat-treated (calcined) at 1450° C. (for 1 hour under a nitrogen gas stream to obtain a setter for heat treatment in powder metallurgy having sizes of 420 mm×250 mm×6 mm. The setter exhibited a bulk density of 1.43 g/ml.

As a result of the evaluation of carburization described above, the thus-obtained carbon-ceramic composite setter exhibited no carburization at either of 1150° C. and 1200° C. and was found to be a satisfactory setter for sintering a metal molding object thereon.

The composition and representative properties of the setter are summarized in Table 1 appearing hereinafter together with those of Examples and Comparative Examples described below.

Example 2

A setter for heat-treatment in powder metallurgy was prepared in the same manner as in Example 1 except for changing the composition of starting materials for the plate-shaped compact to 81 wt.parts of the spherical infusibilized pitch of petroleum origin, 6 wt.parts of the resole-type liquid phenolic resin, 8 wt.parts of the novolak-type solid phenolic resin, and 5 wt.parts of the alumina powder.

Example 3

A setter for heat-treatment in powder metallurgy was prepared in the same manner as in Example 1 except for changing the composition of starting materials for the plate-shaped compact to 79 wt.parts of the spherical infusibilized pitch of petroleum origin, 6 wt.parts of the resole-type liquid phenolic resin, 8 wt.parts of the novolak-type solid phenolic resin, and 7 wt.parts of the alumina powder.

Example 4

A setter for heat-treatment in powder metallurgy was prepared in the same manner as in Example 1 except for changing the composition of starting materials for the plate-shaped compact to 76 wt.parts of the spherical infusibilized pitch of petroleum origin, 6 wt.parts of the resole-type liquid phenolic resin, 8 wt.parts of the novolak-type solid phenolic resin, and 10 wt.parts of the alumina powder.

Comparative Example 1

A setter for heat-treatment in powder metallurgy was prepared in the same manner as in Example 1 except for changing the composition of starting materials for the plate-shaped compact to 80 wt.parts of the spherical infusibilized pitch of petroleum origin, 6 wt.parts of the resole-type liquid phenolic resin, and 14 wt.parts of the novolak-type solid phenolic resin, and omitting the alumina powder.

Comparative Example 2

A setter for heat-treatment in powder metallurgy was prepared by cutting a commercially available extruded graphite material ("PS-G12", made by K. K. S.A.C.) into a plate measuring 420 mm×250 mm×6 mm.

Reference Example

A setter for heat-treatment in powder metallurgy was prepared in the same manner as in Example 2 except for using 5 wt.parts of alumina powder ("A12", made by Nippon Keikinzoku K. K.; alumina content=at least 99%, average particle size=1 μm) instead of 5 wt.parts of the alumina powder ("ALUNDUM PARTICLES #80", made by K. K. Nikkato; $Al_2O_3$ content=at least 99%, average particle size=200 μm).

The composition and representative properties of the setters prepared in the above Examples, Comparative Examples and Reference Example are summarized in Table 1 below.

TABLE 1

| | Ceramic particles | | | Carbonaceous | Setter | | |
|---|---|---|---|---|---|---|---|
| | | Content | Primary particle size | matrix $d_{002}$ | Bulk density | Carburization | |
| Example | Species | (wt. %) | (μm) | (nm) | (g/ml) | 1150° C. | 1200° C. |
| 1 | Alumina | 4.0 | 200 | 0.365 | 1.43 | A | B |
| 2 | Alumina | 6.7 | 200 | 0.365 | 1.43 | A | B |
| 3 | Alumina | 9.3 | 200 | 0.365 | 1.44 | A | B |
| 4 | Alumina | 13.3 | 200 | 0.365 | 1.46 | A | A |
| Comp. 1 | None | 0.0 | — | 0.365 | 1.42 | C | C |
| Comp. 2 | None | 0.0 | — | 0.338 | 1.72 | C | C |
| Reference | Alumina | 6.7 | 1 | 0.365 | 1.43 | C | C |

As described above, according to the present invention, there is provided a support member, particularly a setter for heat-treatment in powder metallurgy capable of effectively preventing carburization of a metal molding object supported during high-temperature heat treatment of the metal molding object supported thereby without causing a problem of peeling of a coating layer as encountered in the case of a ceramic-coated support member. Such a support member can be prepared through a simple process wherein a dispersion mixture of a fine carbon precursor and ceramic particles is compression-molded, and then heat-treated at a temperature of 1000-2000° C. to carbonize the carbon precursor.

What is claimed is:

1. A support member for a high-temperature heat-treated metal molding object, comprising: a carbon-ceramic composite shaped product comprising a carbonaceous matrix and 3-20 wt % of ceramic particles uniformly dispersed in the carbonaceous matrix and partly exposed to a surface of the carbon-ceramic composite shaped product, said carbon-ceramic composite shaped product having a bulk density of 1.2-1.6 g/ml, wherein the carbonaceous matrix comprises a non-graphitic carbon material having a 002-plane layer spacing ($d_{002}$) of at least 0.34 nm.

2. A support member according to claim 1, wherein the ceramic particles have a particle size giving cumulatively 50% by volume of 50-500 μm.

3. A support member according to claim 1, wherein the ceramic particles comprise fused alumina having an alumina purity of at least 90 wt. %.

4. A support member according to claim 1, wherein the carbon-ceramic composite shaped product is a carbonized product of a compression molded compact of a dispersive mixture of carbon precursor particles and ceramic particles.

* * * * *